Oct. 26, 1965     T. C. SALVIN ET AL     3,213,562
ELECTRONIC FISH LURE
Filed Aug. 4, 1961     2 Sheets-Sheet 1
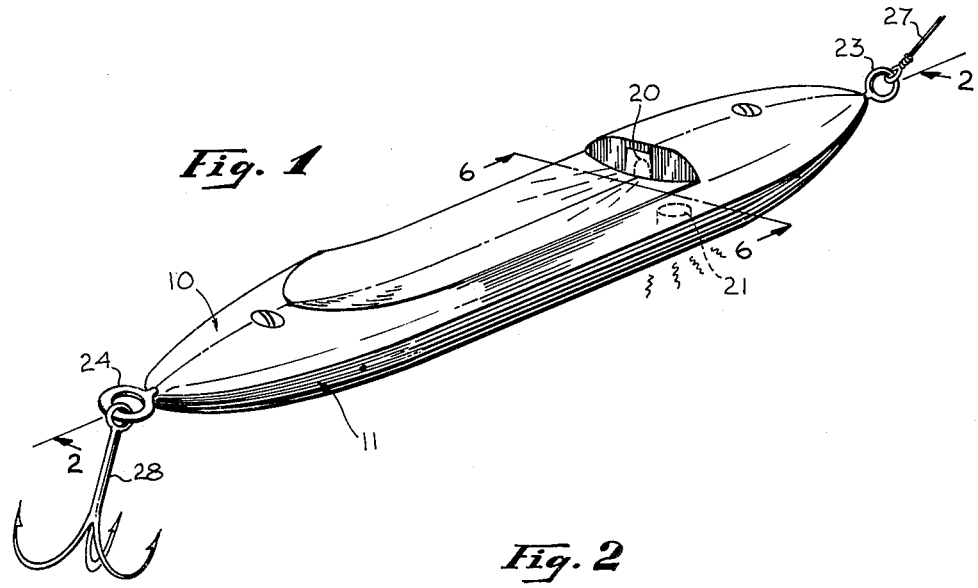
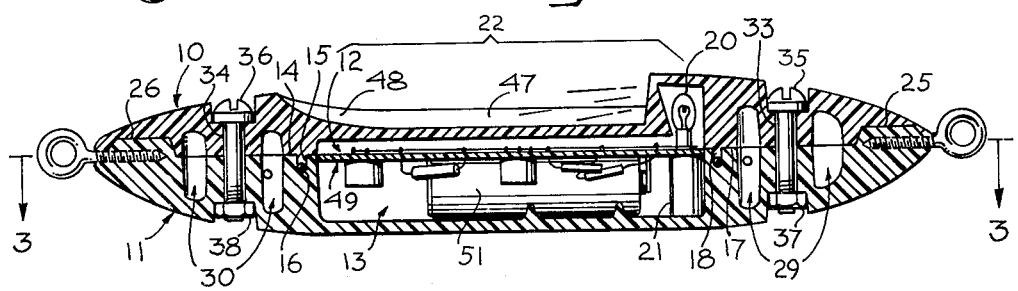
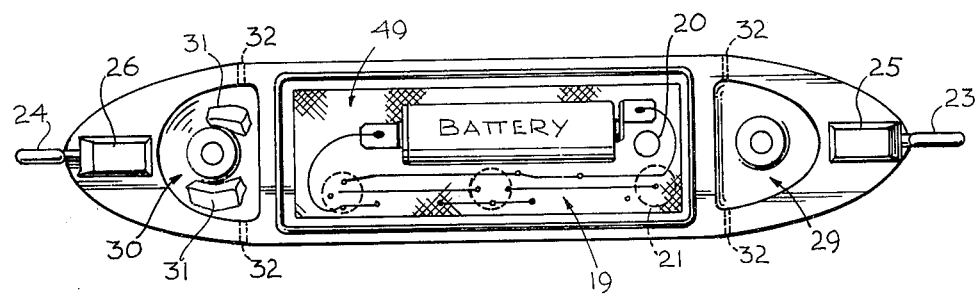
THEODORE C. SALVIN
LAURENCE M. SHEEHAN
INVENTORS
BY Allan M. Shapiro
ATTORNEY

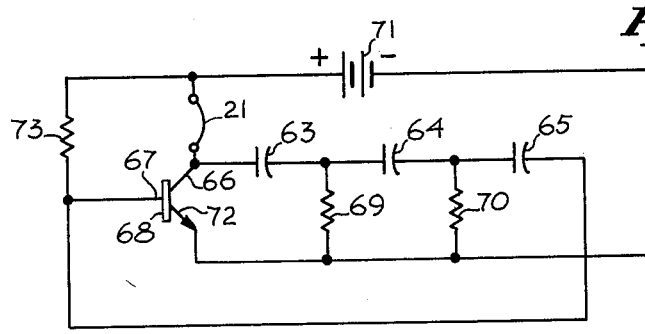
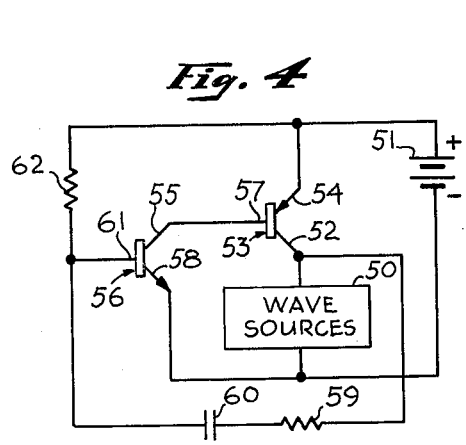
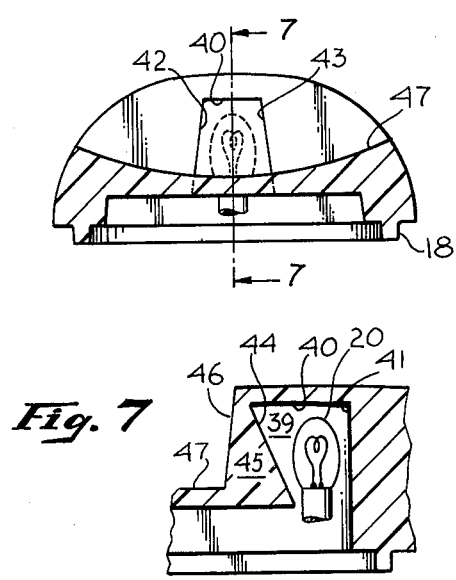
THEODORE C. SALVIN
LAURENCE M. SHEEHAN
INVENTORS
BY Allan M. Shapiro
ATTORNEY United States Patent Office 3,213,562
Patented Oct. 26, 1965

3,213,562
ELECTRONIC FISH LURE
Theodore C. Salvin and Laurence M. Sheehan, both of Los Angeles, Calif., assignors, by mesne assignments, to John C. Sheehan, Glendale, Calif.
Filed Aug. 4, 1961, Ser. No. 129,368
8 Claims. (Cl. 43—17.5)

The present invention relates to electronic fishing lures and, more specifically, to a lure provided with means for intermittently flashing a light from and upon the lure and means for actuating an acoustic transducer to cause sound to be emanated from the lure.

As is well known to those skilled in the fish lure art, fish are attracted by both light and sound. Passive lures have employed various configurations, colorings, markings and ornamentation for the purpose of simulating bait in their actions and appearances. However, one of the major difficulties in passive lures is the requirement for external light in order for the lure to manifest its various features. Dependent upon the amount of sunlight available and the depth and degree of opacity of the water in which the lure is operated, passive lures vary in their degrees of effectiveness. Consequently, there have been numerous attempts in the past to provide a fish lure with its own light source so that the lure may be independent of external factors for its operational attractiveness. However, such prior art attempts have been largely unsuccessful for several reasons including, for example, the size and weight of the mechanical and electrical components utilized, the excessive power requirements, the short life and lack of reliability, the problems of sealing the lure against the water environment, and so forth. A further factor, which accentuates the above difficulties, involves the desirability of causing the light source to be actuated intermittently in order to provide a flashing effect since, in nature, fish do not provide a constant level of light reflection continually during movement through the water but, rather, cause a flashing effect due to the continual changes in the angles of incidence and reflection of light from external sources.

Further, while it has long been recognized that fish are attracted by sound, the prior art has been unable to develop a commercially feasible sound system for incorporation within the lure itself for various reasons including, among others, most of the factors mentioned hereinabove in connection with the problems relating to the incorporation of a light source in the lure.

Therefore, it is one of the objects of the present invention to provide a fish lure with a self-contained light source of minimum size and weight and maximum reliability and life.

Another object of the present invention is the provision of a fish lure with a self-contained intermittent light source having only transistors and passive electronic components.

A further object of the present invention is to provide a fish lure with self-contained sources of both light and sound.

An additional object of this invention is the provision of a fish lure with a self-contained source of intermittently flashing light and a configured external surface for reflecting such light.

A still further object of the present invention is the provision of a modular electronic construction for either or both a light and a sound source for mounting within fish lure bodies having differing sizes and shapes.

According to the present invention, a fish lure is provided with an internal cavity and means for transmitting both light and sound waves therefrom. In one preferred embodiment of the present invention, at least one external surface of the lure is provided with a concave surface portion having one end thereof disposed adjacent to light distributor means, such means and surface portion being cooperably related for causing the distribution and reflection of a maximized amount of light from the surface portion. The light distributor means may be an integral part of the body member and have a configuration adapted for concentrating the emanated light upon the reflective surface portion. An electronic switch circuit is provided for intermittently driving a light bulb from a battery source of power for causing the bulb to flash at the desired rate and intensity. There is also provided an electronic oscillator circuit for actuating an acoustic transducer within the audio range determined desirable for attraction of the particular species of fish being sought, in accordance with known or theoretical considerations. The electronic circuits are mounted upon a board or boards insertable within the cavity of the body member and completely contained within the lure, an O-ring or other sealing means being used to prevent the access of moisture to the cavity. In one embodiment, the body member comprises two mating portions which are secured to each other by machine screws or other convenient means and which permit, by separation, access to the cavity and the electronic circuit parts for replacement of the battery and/or bulb.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view of a fish lure in accordance with the present invention;

FIGURE 2 is a sectional view along line 2—2 of FIGURE 1;

FIGURE 3 is a top plan view along line 3—3 in FIGURE 2;

FIGURE 4 is a schematic diagram of the light and/or sound source circuit;

FIGURE 5 is a schematic diagram of an alternative sound source circuit;

FIGURE 6 is an enlarged fragmentary elevational view, partly in section, as seen along line 6—6 in FIGURE 1;

FIGURE 7 is a fragmentary sectional view along line 7—7 in FIGURE 6; and

FIGURE 8 is a perspective view of another embodiment of a fish lure in accordance with the present invention.

Referring to the drawings, and particularly to FIGURES 1, 2 and 3, trere is seen a fish lure having an upper body portion 10 and a lower body portion 11 of generally mating streamlined configurations and preferably composed of molded plastic. Body portions 10 and 11 are formed with respective cavities 12 and 13 adapted to contain the electronic components of the device. The upper surface 14 of the lower body portion 11 is provided with a groove 15 for containing an O-ring type seal 16 and completely surrounds the cavities 12 and 13. The bottom surface 17 of the upper body portion 10 is provided with a projection 18 which mates with the groove 15 in the surface 14 to compress the seal 16 and provide a watertight enclosure for the electronic components after assembly and during operation of the device. The electronic components, examples of which are to be described more completely hereinafter, are indicated generally at 19 within the cavities 12 and 13 and include a light source 20 and an electro-acoustic transducer 21. The upper body portion 10 includes a light distributor, indicated at 22, to be described more completely hereinafter.

A pair of fore and aft eye hooks 23 and 24 are screwed into raised portions 25 and 26, respectively, of the lower body portion 11. A line 27 and a hook 28 or other portions of the usual fishing paraphernalia may be secured to the eye hooks 23 and 24. The body portions 10 and 11 are provided with fore and aft ballast chambers 29 and 30 for containing heavy objects such as lead weights 31 and also are vented by ports, such as indicated at 32, to permit water to enter the chambers 29 and 30. Sufficient weights 31 may be added to overcome the buoyancy of the lure due to the cavities 12 and 13, and such weights may be evenly distributed in the two ballast chambers 29 and 30 or may be unequally distributed in order to cause the lure to tend to be tilted in either forwardly upward or forwardly downward position during use. Body portions 10 and 11 are provided with apertures 33 and 34 for receiving respective machine screws 35 and 36 and nuts 37 and 38 for releasably securing the body portions 10 and 11 together. The external surfaces of the lure may be recessed, as shown, for receiving the screw heads and nuts.

Referring to FIGURES 6 and 7 in conjunction with FIGURES 1, 2 and 3, the light distributor 22 includes an internal cavity 39 communicating with the other cavities 12 and 13 and bounded by surfaces 40, 41, 42 and 43 and the inner surface 44 of a wall or window portion 45. The surfaces 40–43 are opaque and preferably painted or otherwise covered with a highly reflective material so as to concentrate the amount of light transmitted through the window portion 45. In the preferred embodiment illustrated, the window portion 45 constitutes a prism having its outer surface 46 sloped at an approximate 5° angle forwardly from a vertical, and the inner surface 44 sloped at an approximate 30° angle rearwardly from the vertical, the light transmitted therethrough being caused thereby to be bent downwardly to an extent sufficient to cause substantially all of the transmitted light to be distributed upon an external surface 47 of the body portion 10 for reflection therefrom into the surrounding water. The reflecting surface 47 may have an arcuate configuration symmetrical throughout its major length about a longitudinal center line, as shown, terminating in an upwardly arcuate rear surface portion 48.

The light source 20 may be any one of several types such as, for example, a bulb containing a bimetallic element responsive to temperature changes for making and breaking contact between a battery and a light-emitting filament and operable in a manner such that the bi-metallic element is heated by the filament so as to break the contact and, then, upon subsequent cooling, remake the contact for lighting the filament again. However, in the prefered embodiment illustrated, the light source 20 comprises an incandescent light bulb of great brilliancy and operable upon relatively low voltage, such as a General Electric No. 1728 bulb. The light source 20 as well as the electro-acoustic transducer 21 and the electronic components utilized for supplying intermittent power to such transmitting devices are mounted upon a board 49, which may be composed of canvas impregnated with phenolic resin, and constitute a modular component utilizable as a replaceable module in any one of a number of lure bodies.

Turning now to FIGURE 4, there is seen a circuit diagram of a preferred embodiment of the electronic circuitry for operating the wave transmitting sources 50 which include either or both the light source 20 and the electro-acoustic transducer 21 constituting the sound source for the fish lure of the present invention. The circuit illustrated may be denominated a free-running multivibrator or an oscillator, the particular designation being merely indicative of its function in causing the transmitting source or sources 50 to receive varying levels of energy. The wave sources 50 are connected between the negative side of a battery 51 and the collector 52 of a PNP transistor 53, the emitter 54 of which is connected to the positive side of the battery 51. The collector 55 of an NPN transistor 56 is connected to the base 57 of transistor 53, and the emitter 58 of transistor 56 is connected to the negative side of the battery 51. The collector 52 of transistor 53 is connected through the series combination of resistor 59 and capacitor 60 to the base 61 of transistor 56 and also through resistor 62 to the positive side of battery 51. The RC constant of resistor 59 and capacitor 60 determine the switching rate for transistor 56 which, in turn, controls the switching rate of transistor 53. Taking into consideration the size of the battery 51 and the voltage and current requirements of wave sources 50, the wave sources may be connected either in series or in parallel.

Referring to FIGURE 5, there is shown an oscillator circuit for driving the electro-acoustic transducer sound source 21 independently of the light source 20. An RC pi-network comprises a series of capacitors 63, 64 and 65 connected between the collector 66 and the base 67 of transistor 68, and resistors 69 and 70 having common ends connected to the negative side of the battery 71 and the emitter 72 of transistor 68 and their other ends connected to opposite sides of capacitor 64. Resistor 73 is connected between the positive side of battery 71 and both the base 67 and capacitor 65. The sound source 21 is connected between the collector 66 and the positive side of battery 71. The operation of the illustrated circuit will be obvious to those skilled in the art.

Referring to FIGURE 8, the same reference numerals being used for similar elements, there is seen a modified embodiment of a fish lure in accordance with the present invention. The upper and lower body portions 10 and 11, respectively, are curved at the tail end 74 to present a bass plug type of lure configuration, with the hook 28 attached to the eye hook 24 which is secured to the lower body portion 11 at the rear surface portion 48 of the reflective surface 47 (the underside of the lure in the position shown). The electronic module board 49 is located within the lure body in the same manner as previously illustrated and described. The light source 21 cooperates with the light distributor 22 in the manner previously described, but the light distributor 22 projects outwardly from the lure body because of the difference in the particular lure configuration.

In operation, the battery is inserted into the electronic module and, thereupon, the wave sources 20 and/or 21 immediately begin emitting their light and/or sound waves in an intermittent manner, the repetition rate being determined by the electronic circuit parameters and desirably being in the range of 60 to 90 pulses per minute, for example. The body portions 10 and 11 are then secured together by means of the screws 35 and 36 and nuts 37 and 38, and the device is then ready for use in conjunction with the other fishing tackle in the well known manner. In the water, experimentation has indicated that the fishing light and sound waves can be seen and/or heard by fish for greater distances than previously available so that the area within which attraction can be obtained is considerably extended and, further, that even when the fish are within a range wherein an ordinary lure would be visible to them, the degree of attractiveness tends to be relatively greater so that strikes are obtained on lures of the present invention with relatively greater frequency.

It should be noted that the electronic module may be completely encapsulated, such as by epoxy resin, to minimize corrosion and maximize physical strength although, inherently, the module is not susceptible to deterioration or breakdown.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:
1. A fish lure comprising:
a body having wall portions forming a cavity within said body,
a light source disposed in said cavity,
electronic means disposed within said cavity for operating said light source,
means constituted by one of said wall portions adapted to transmit light from said source therethrough to the external surface thereof, and
means constituted by another of said wall portions to have impinged upon and reflect said transmitted light outwardly from the external surface thereof.

2. A fish lure comprising:
a body having wall portions forming a cavity within said body,
a light source disposed in said cavity,
electronic means disposed within said cavity for intermittently operating said light source,
means constituted by one of said wall portions adapted to transmit light from said source therethrough to the external surface thereof, and
means constituted by another of said wall portions to have impinged upon and reflect said transmitted light outwardly from the external surface thereof.

3. A fish lure comprising:
a body having wall portions forming a cavity within said body;
a light source disposed in said cavity;
electronic means disposed within said cavity for operating said light source;
transparent prism means constituted by one of said wall portions adapted to transmit light from said source therethrough to the external surface thereof; and
means constituted by another of said wall portions to have impinged upon and reflect said transmitted light outwardly from the external surface thereof.

4. A fish lure comprising:
a body having wall portions forming a cavity within said body;
a light source disposed in said cavity;
electronic means disposed within said cavity for intermittently operating said light source;
transparent prism means constituted by one of said wall portions adapted to transmit light from said source therethrough to the external surface thereof; and
means constituted by another of said wall portions to have impinged upon and reflect said transmitted light outwardly from the external surface thereof.

5. A fish lure comprising:
a body having wall portions forming a cavity within said body;
a light source disposed in said cavity;
electronic means disposed within said cavity for operating said light source;
means constituted by one of said wall portions adapted to transmit light from said source therethrough to the external surface thereof; and
means constituted by another of said wall portions to have directed upon and reflect said transmitted light outwardly from the external surface thereof.

6. A fish lure comprising:
a body having wall portions forming a cavity within said body;
a light source disposed in said cavity;
electronic means disposed within said cavity for intermittently operating said light source;
means constituted by one of said wall portions adapted to transmit light from said source therethrough to the external surface thereof; and
means constituted by another of said wall portions to have directed upon and reflect said transmitted light outwardly from the external surface thereof.

7. A fish lure comprising:
a body having wall portions, at least some of said wall portions forming a cavity within said body;
a light source disposed in said cavity;
electronic means disposed within said cavity for operating said light source;
means constituted by one of such cavity-forming wall portions adapted to transmit light from said source therethrough to the external surface thereof; and
means constituted by another of said wall portions to have directed upon and reflect said transmitted light outwardly from the external surface thereof.

8. A fish lure comprising:
a body having wall portions, at least some of said wall portions forming a cavity within said body;
a light source disposed in said cavity;
electronic means disposed within said cavity for intermittently operating said light source;
means constituted by one of such cavity-forming wall portions adapted to transmit light from said source therethrough to the external surface thereof; and
means constituted by another of said wall portions to have directed upon and reflect said transmitted light outwardly from the external surface thereof.

References Cited by the Examiner

UNITED STATES PATENTS

| | | | |
|---|---|---|---|
| 2,080,851 | 5/37 | Gallasch et al. | 240—21 |
| 2,184,031 | 12/39 | Wyatt | 43—42.39 |
| 2,613,471 | 10/52 | Traycik | 43—42.33 |
| 2,665,511 | 1/54 | Bradbury | 43—42.39 |
| 2,828,572 | 4/58 | Sargent | 43—42.39 |
| 2,897,623 | 8/59 | Flournoy | 43—17.6 |
| 2,927,391 | 3/60 | Herter | 43—17.1 |
| 2,977,705 | 4/61 | Busnel | 43—17.1 |

OTHER REFERENCES

Transistor Circuit Handbook, by L. E. Garner, page 89, 1957 Edition, pub. 1956 by Coyne Electrical School, Chicago, Ill.

ABRAHAM G. STONE, *Primary Examiner.*

F. RAY CHAPPELL, *Examiner.*